May 12, 1925.  1,537,410
R. A. COURTNEY
SANITARY SUGAR BOWL
Filed Jan. 8, 1923
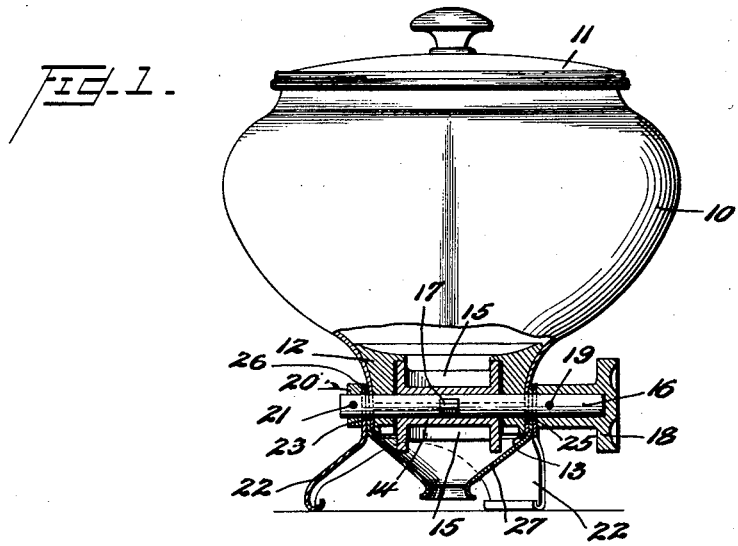
FIG. 1.
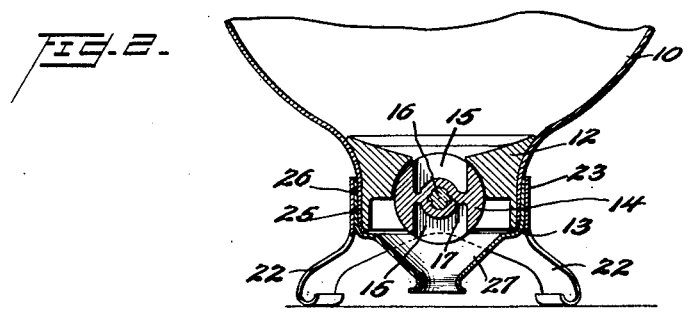
FIG. 2.
FIG. 4.
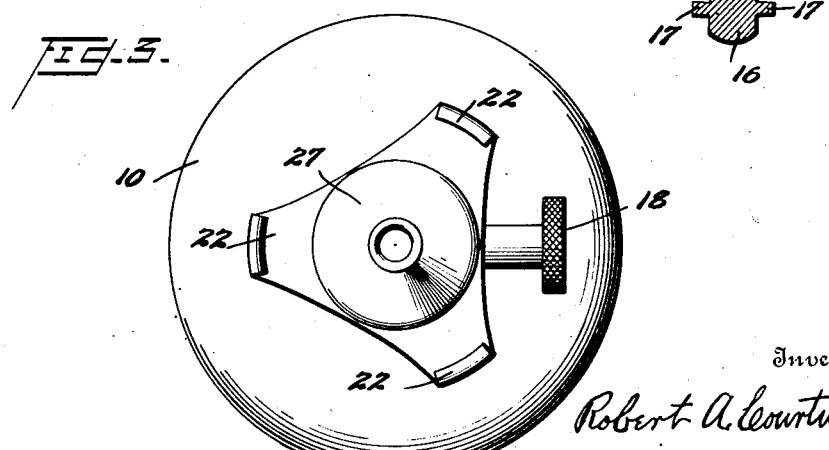
FIG. 3.
Inventor
Robert A. Courtney
By Watson, Coit, Morse & Grindle
Attorneys Patented May 12, 1925.

1,537,410

UNITED STATES PATENT OFFICE.

ROBERT A. COURTNEY, OF WESTMINSTER, MARYLAND.

SANITARY SUGAR BOWL.

Application filed January 8, 1923. Serial No. 611,540.

*To all whom it may concern:*

Be it known that I, ROBERT A. COURTNEY, a citizen of the United States, and a resident of Westminster, Carroll County, State of Maryland, have invented certain new and useful Improvements in Sanitary Sugar Bowls, of which the following is a specification.

This invention consists in a sugar bowl adapted for measuring and serving sugar directly into cups. The device may obviously be used for other culinary purposes, such as measuring ground coffee, salt etc. Primarily, however, the invention is a covered vessel adapted to stand on a dining table and to be used for delivering measured quantities of sugar into tea and coffee cups. The vessel is normally closed to exclude dampness and insects and the sugar is discharged without opening communication between the interior of the vessel and the outer air.

The object of the invention is to provide a device of this character which is light, neat looking and which can be produced at minimum cost. To this end the body of the vessel and the cover and also its support are preferably formed of sheet aluminum. The invention will be further described in connection with the accompanying drawing in which:

Fig. 1 is a side elevation of a sugar bowl, the lower part being in section;

Fig. 2 is a sectional view of the lower part taken on a plane at right angles to the section in Figure 1;

Fig. 3 is a bottom plan view; and

Fig. 4 is an enlarged section of the shaft on the same plane as in Figure 2.

Referring to the drawing 10 indicates the body of a sugar bowl and 11 a suitable cover therefor. The body and cover are preferably formed of sheet aluminum, although they may be of silver or other metal. The bottom of the body is formed with a contracted neck in which is fitted a base 12 which may be an aluminum casting. The base at its upper margin fits close to the body 10 and the lower edge of the body is preferably provided with an inwardly turned flange 13 fitting the bottom margin of the base, as shown in Figures 1 and 2.

The base is provided with a central opening in which is fitted a rotating cylinder 14 having pockets 15. As shown, there are two diametrically opposite pockets each of which is designed to hold approximately a teaspoonful of sugar or other material. The cylinder 14 is carried by a shaft 16 which as shown is provided with two fins or integral keys 17. On one end of the shaft is a knob 18 which is securely connected, as by the pin 19. On the other end of the shaft is a collar 20 securely connected as by the pin 21.

The bowl is supported by three legs 22 which are preferably constructed of an integral piece of sheet material of the same character as the bowl. The upper end of the supporting part is cylindrical as shown at 23 and telescopes over the lower part of the bowl. Between the part 23 and the lower cylindrical part of the bowl 25 is located the upper cylindrical portion 26 of a funnel 27. The funnel is symmetrical and centrally arranged between the legs 22 and terminates slightly above the feet of the legs.

The cylindrical portion 26 of the funnel fits snugly on the part 25 of the bowl and the cylindrical portion 23 of the legs or supports fits snugly upon the part 26. The legs and the funnel are connected to the bowl permanently by the shaft 16 which passes through all three of the said cylindrical portions. The cylinder 23 as shown is grooved throughout its length and the base 12 is also grooved to permit the passage of the fins or keys so that the shaft 16 may be readily introduced.

It will be noted that I have produced a sugar bowl or like device provided with a means for measuring and dispensing small quantities of the contents which is attractive in design and all parts of which are secured together by the shaft 16 and the knob and collar on the shaft. The entire device, as previously stated, is intended to be very light and in use it is designed to be lifted and held over a cup or other receptacle with one hand while the knob is turned with the other hand to feed one or more portions of sugar or other ingredients from the bowl into the funnel from which it will flow into a cup or other receptacle.

Having thus described my invention what I claim and desire to secure by Letters Patent is:

A sugar bowl or the like having a sheet metal body provided with a lower cylindrical portion, a base fitting within said cylindrical portion, a funnel having a cylindrical portion fitting over the corresponding portion of the bowl, supporting legs having a cylindrical portion fitting over the corresponding portion of the funnel, a shaft extending through all of said parts and permanently connecting them and a cylinder on said shaft provided with pockets for removing portions of the contents of the bowl and delivering them into the funnel when the shaft is turned.

In testimony whereof I hereunto affix my signature.

ROBERT A. COURTNEY.